L. DI PRIMIO.
COOKING APPARATUS.
APPLICATION FILED JULY 12, 1915.

1,181,578.

Patented May 2, 1916.

WITNESSES
James L. Wehn.
D. M. Ringle.

INVENTOR
Luigi Di Primio,
By T. B. Humphries
Attorney

UNITED STATES PATENT OFFICE.

LUIGI DI PRIMIO, OF PITTSBURGH, PENNSYLVANIA, ASSIGNOR, BY DIRECT AND MESNE ASSIGNMENTS, OF ONE-THIRD TO ANTONIO TOLLIS, OF PITTSBURGH, PENNSYLVANIA, AND ONE-THIRD TO ANTONIO RANALLO.

COOKING APPARATUS.

1,181,578.  Specification of Letters Patent.  Patented May 2, 1916.

Application filed July 12, 1915. Serial No. 39,404.

*To all whom it may concern:*

Be it known that I, LUIGI DI PRIMIO, a subject of the King of Italy, residing at Pittsburgh, in the county of Allegheny and State of Pennsylvania, have invented a new and useful Improvement in Cooking Apparatus, of which the following is a specification.

My invention relates to cooking apparatus and particularly to an apparatus by the aid of which edibles such as meats, etc., can be very quickly and conveniently cooked, and which can be so folded as to be readily carried in the pocket of the owner.

The object of my invention is to provide a cheap, simple, and efficient form of cooking apparatus which is very light in construction and the cooking compartment of which is made air tight, so that the heated vapors and air within the interior of the same will circulate freely and thus cook the edibles in the shortest period of time.

Another object of my invention is to provide a portable cooking apparatus which can be set up in the shortest period of time and one in which small pieces of paper or other inflammable matter may be used as fuel.

My invention consists generally stated in the novel arrangement, construction, and combination of parts, as hereinafter more specifically set forth and described and particularly pointed out in the claim hereunto appended.

Figure 1:
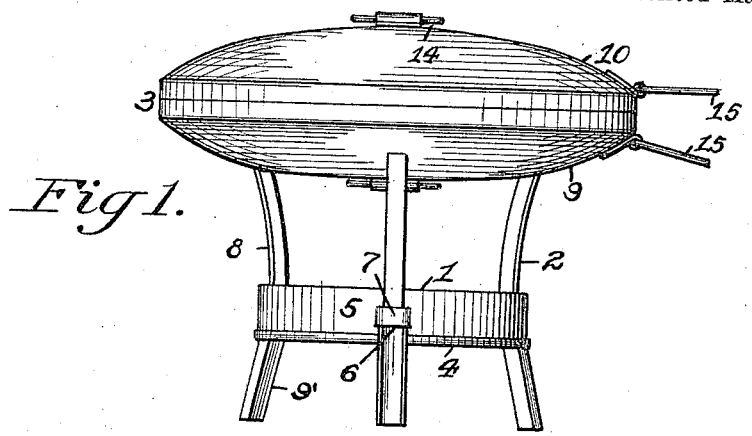
Figure 2:
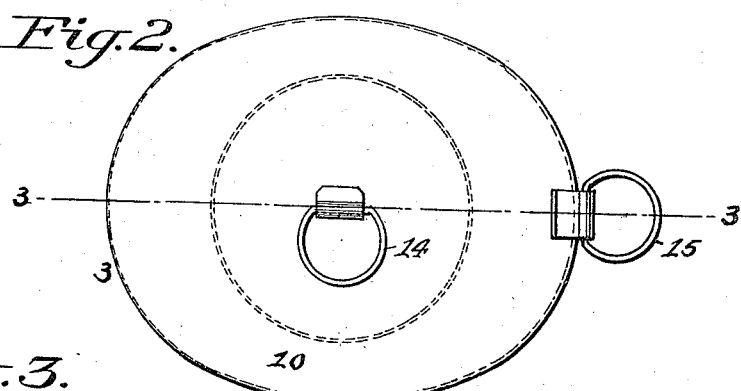
Figure 3:
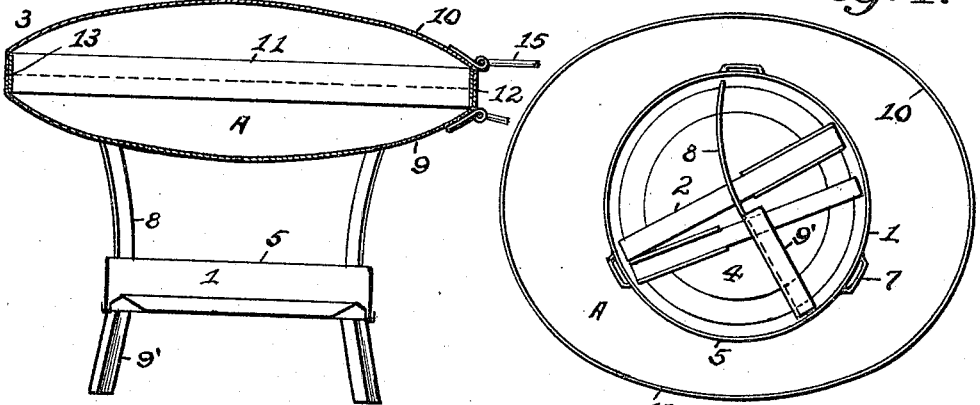
Figure 4:
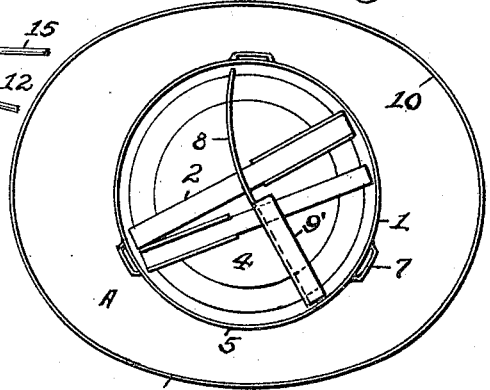
Figure 5:
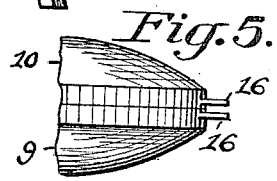

To enable others skilled in the art to which my invention appertains to construct, operate and use my improved cooking apparatus, I will describe the same more fully, referring to the accompanying drawing, in which:

Figure 1 is a front elevation showing the apparatus in position for use. Fig. 2 is a top plan view of the same. Fig. 3 is a longitudinal sectional view of the apparatus on the line 3—3 of Fig. 2. Fig. 4 is a top plan view of the apparatus with the top cover removed and showing the parts folded to permit the same to be carried. Fig. 5 is a modification showing lugs attached to the cooking trays for separating the same.

Like symbols of reference herein indicate like parts in each of the figures of the drawing.

As illustrated in the drawing my invention consists of the fuel tray 1, the standards 2, and the cooking compartment 3. The fuel tray 1, is formed of any suitable material such as tin or other like metal, and has the base plate 4 and the annular flange 5 for retaining fuel on said plate. At suitable intervals throughout the same, the flange 5 is provided with a pair of longitudinally parallel slots 6 and the metal 7 included between said slots is pressed outward beyond the periphery of said flange in order to form a sufficient distance to permit the standards 2 to pass between the pressed out metal 7 and the periphery of the flange 5. The standards 2 are formed of any suitable material such as tin, aluminum, etc., and are provided with the upper curved flat portion 8 and the lower channel portion 9' as hereinafter explained. While I have shown but three standards I do not limit myself to any particular number.

The cooking compartment 3 is composed of the two semi-oval shaped trays 9 and 10, which are preferably formed of aluminum or some other material light in weight, and the metal in such trays is reasonably thin to allow the interior of the same to become heated very rapidly. The lower tray 9 is provided with an annular flange 11 immediately within the outside edge 12 of said tray and said flange is adapted to fit within the outside edge 13 of the upper tray 10 in order to form a substantially air tight compartment A between the two tray sections. The semi-oval shaped trays 9 and 10 are so constructed that there are no sharp corners or pockets which would obstruct the free circulation of the heated air and vapor within the compartment. If desired, each of the trays 9 and 10 may be provided with a ring 14 for better securing the trays together or disengaging the same. The trays 9 and 10 are also provided with a ring 15 arranged as shown in Fig. 1 in order that the trays may be readily separated. In Fig. 5 the rings 15 are omitted and lugs 16 substituted so that a knife or other instrument may be placed between the same and when given a slight turn the trays will be easily separated.

The use of my improved cooking apparatus is as follows:—Considering the apparatus set up for use in the position as shown in Fig. 1 and meat, eggs, fish, or other edibles within the compartment A, small pieces of lighted paper are placed on to the fuel tray 1 and the heat from said burning paper is communicated to the under face of the lower tray 9, and as the heated air and vapor within such compartment cannot escape, it circulates rapidly and quickly cooks the contents of the compartment. In case steaks, chops or other edibles, which are usually cooked on both sides are within the compartment A, the trays 9 and 10 may be turned over quickly so that the tray 10 is beneath the tray 9, whereupon the steak or chops will have their reverse side cooked in the usual manner.

In setting up my improved cooking apparatus, the standards 2 are passed through the slots 6, so that the curved flat portion 8 lies between the pressed out metal 7, and the periphery of the flange 5, while the upper end of the channel portion 9′ rests with its flanges against the lower part of the pressed out metal 7, while the lower end of the standards 2 may be placed upon the ground or a table, etc. The upper ends of the curved flat portions 8 of the standards 2 are adapted to form supporting points for the cooking compartment 3. The edibles to be cooked are placed upon the lower tray 9 and the upper tray 10 over the annular flange 11 on the tray 9, so that a substantially air tight joint is obtained.

In case it is desired to place the apparatus in the pocket of the owner or user the standards 2 may be withdrawn from the slots 6 in the flange 5 and placed within the fuel tray 1 and the fuel tray placed within the compartment A as shown in Fig. 4, so that the trays 9 and 10 constitute the overall dimensions of the apparatus which can be very conveniently carried in the pocket of an ordinary hunting coat or overcoat.

It will readily be seen that with the use of my improved cooking apparatus, steaks, chops, eggs, etc., may be very quickly cooked by reason of the heated air and vapors being confined within the cooking compartment and various experiments and tests have demonstrated that steak of ordinary thickness can be thoroughly cooked in one minute's time with the use of nothing but scraps of newspaper as fuel.

It will be understood that I do not limit myself to any particular size of apparatus as any size may be made. It will also be readily seen that by forming the same of aluminum or other like metal the apparatus can be readily carried on the person of the user, and the construction of the fuel tray and standards permit of the quick setting up and disconnecting of the parts, which when not in use can be very conveniently carried within the tray sections 9 and 10.

My invention will be of particular value to picnickers, or parties taking tramps, canoeists, laborers, soldiers, and others on account of the convenience and rapidity with which food may be cooked.

While I have spoken only of paper as a fuel I do not limit myself to any particular fuel, as small twigs, tallow candles, gas, alcohol, or any other adaptable fuel may be used.

Various modifications and changes in the design and construction of my improved cooking apparatus within the scope of the appended claim, may be resorted to without departing from the spirit of the invention or sacrificing any of its advantages.

What I claim as my invention and desire to secure by Letters Patent is:

The combination of a fuel container and supporting standards therefor, said container having means on its marginal wall to receive said standards, each of said standards having a relatively rigid channel-shaped portion to engage at one end upon the ground, the remaining portion of the standards being outwardly inclined with respect to the channel portions and adapted for detachable engagement with the means on the marginal wall of the container, said standards being adapted to support a cooking vessel above the container and in spaced relation thereto, said inclined portions of the standards preventing upward movement of the container and the channel flanges preventing downward movement thereof.

In testimony whereof I affix my signature in the presence of two witnesses.

LUIGI DI PRIMIO.

Witnesses:
JAMES L. WEHN,
T. B. HUMPHRIES.

Copies of this patent may be obtained for five cents each, by addressing the "Commissioner of Patents, Washington, D. C."